Aug. 31, 1937.   O. RÖHM ET AL   2,091,615
PROCESS FOR THE MANUFACTURE OF POLYMERIZATION PRODUCTS
Filed Oct. 16, 1934

INVENTOR.
Otto Röhm
Walter Bauer
BY
Robert W. Englehart
ATTORNEY.

Patented Aug. 31, 1937

2,091,615

UNITED STATES PATENT OFFICE 2,091,615

PROCESS FOR THE MANUFACTURE OF POLYMERIZATION PRODUCTS

Otto Röhm and Walter Bauer, Darmstadt, Germany, assignors to Röhm & Haas Company, Philadelphia, Pa.

Application October 16, 1934, Serial No. 748,472
In Germany October 9, 1933

12 Claims. (Cl. 49—81)

This invention relates to the manufacture of polymerization products. Thus it is applicable to the manufacture of laminated glass as well as to the manufacture of glass substitute.

Several processes have been proposed for manufacturing laminated glass using various materials as the intermediate layer, such as cellulose esters, polymerized esters of acrylic acid, etc. and vinyl esters. In some cases, notably with the cellulose esters, a sheet of the ester is fastened to two sheets of glass by means of an adhesive such as gelatin. The polymerized esters mentioned may also be applied in the same way or they may be dissolved in a suitable solvent, poured on the glass, the solvent evaporated and a second glass sheet combined with the first by means of heat and pressure. Furthermore it has been proposed to manufacture laminated glass by polymerizing in situ.

In the copending application Ser. No. 748,471 of Otto Röhm, filed October 16, 1934, is shown a method for polymerizing unsaturated organic compounds in the form of slabs in such manner that no bubbles are formed in the material during the polymerization process.

It has also been found that by modifying this method it can be applied directly to the manufacture of laminated glass.

The method of the copending application Ser. No. 748,471 consists briefly in polymerizing the material in narrow preferably vertical cells which are heated evenly over the entire surface of the larger vertical walls, thus avoiding local overheating and the consequent formation of bubbles.

According to the present invention such cells may be made directly from the glass sheets which are to be joined together by a reinforcing or laminating layer.

This is done in the following manner:—

A thin, narrow strip of an elastic material is fastened at the edges of the flat surface of a piece of glass of any desired shape or size so as to form a low ridge. If the glass is square or rectangular, three sides are thus prepared and if of a circular or elliptical shape, the strip of elastic material is not fastened around the entire edge but a small space is left. A second glass sheet of the same size is now laid on the first in such manner that it also adheres firmly to the strips of elastic material. In this way there is formed a narrow cell, the main walls of which are formed by the glass.

The material to be polymerized is then poured into this cell. The opening may also be closed as far as suitable to avoid evaporating of the liquid, for instance with paper. The material is then heated to the required temperature for a period of time necessary to complete the polymerization. When the polymerization is completed a strong, well-stuck laminated glass is obtained.

The process may also be carried out in the following manner:—

Thin discs corresponding in thickness to about the final thickness of the laminating layer are fastened to a glass plate. These discs are made of a plastic material, preferably of the polymer of the liquid which is to be subsequently polymerized between the glass sheets. An adhesive, preferably a solution of the material of which the discs are made may be used to effect a firm joint. A second glass sheet of the size of the first is then laid upon the discs and fastened thereto by the same adhesive.

The edges of the assembly are then closed by fastening a strip of paper or other suitable material to the edges of the glass, leaving an opening through which the material to be polymerized may be poured. The glass cell and its contents are then heated to effect polymerization.

During polymerization a contraction in the volume of the material takes place. Since the material adheres firmly to the glass this contraction will draw the glass sheets closer together, thus exerting a pressure on the strips or discs of the plastic material which causes them to flow slightly, thus compensating for the reduction in volume and preventing the material from pulling away from the glass. Thus it is necessary to make the strips or discs slightly thicker than the desired final thickness of the laminating layer. This can be accurately done and is of advantage in the preparation of compound lenses where the layer joining the two glass lenses must be of a definite uniform thickness.

This process is illustrated in the drawing in which

Figure 1:
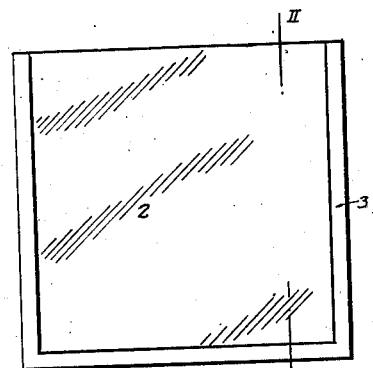
Fig. 1 is a plan view of square sheets of glass with a marginal strip of plastic material.
Figure 2:
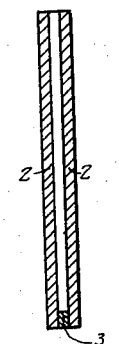
Fig. 2 is a cross-section on line II—II of Fig. 1.
Figure 3:
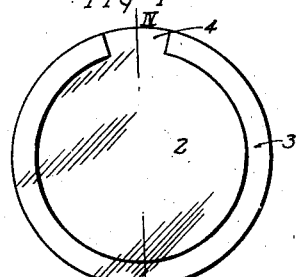
Fig. 3 is a plan view of circular glass sheets with a marginal strip.
Figure 4:
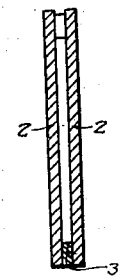
Fig. 4 is a cross-section on line IV—IV of Fig. 3.

Referring specifically to the drawing Figs. 1-4, two glass sheets 2 of any desired size or shape are held together by a marginal strip 3 of plastic material. If the sheets are rectangular as in Fig. 1 the upper edge is left open and if round as in Fig. 3, the strip does not completely close leaving an opening 4, through which the liquid to be polymerized may be poured.

Figure 5:
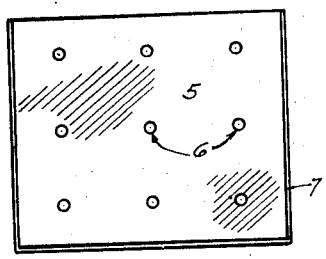
Fig. 5 is a plan view of two sheets of glass with spacing discs and paper lined edge.

Fig. 5 illustrates the method when two glass sheets 5 are fastened together by plastic discs 6 and the edges sealed with strips of paper 7. Round glass sheets may also be used in this method.

The strips and discs may be of any desired thickness depending on the use to which the finished product is to be put. For ordinary safety glass 0.3 to 1.0 mm. is satisfactory. The strips may be about 0.5 cm. wide and the discs 0.5 to 1.0 cm. in diameter, although these dimensions may be varied according to circumstances and still be within the scope of the invention.

The materials which may be polymerized between glass sheets as described above include polymerizable unsaturated organic compounds such as the esters of acrylic and methacrylic acids, vinyl esters, styrol, etc. Plasticizers, coloring matter and catalysts may be added to the monomeric material before pouring it between the glass sheets. Mixtures of the above materials may also be used. Preferably the material is heated for a short time to a temperature near the boiling point of the monomer before the polymerization takes effect.

The plastic material used for the strips or discs is preferably a polymer of the same material used for the laminating layer so that when the polymerization is complete, the entire intermediate layer is homogeneous. Instead of the polymer other materials may be used which are elastic and somewhat plastic such as India rubber, paper or gelatin, especially together with softening agents. The India rubber should not contain any substances preventing the polymerization. The marginal strips described may be replaced by small spacing blocks at the edges of the glass sheets which hold the sheets apart and by a strip of paper which overlaps and is glued upon the outsides of the sheets around the edges so as to make a closed cell.

The following examples will illustrate the process but are not intended to limit it as to materials used or conditions of polymerization.

*Example 1.*—A strip of polymerized material obtained by polymerizing a mixture of 65 parts of methyl methacrylate, 35 parts of isobutyl phthalate and a small amount of benzoyl peroxide is fastened around three edges of a square piece of glass by means of a dilute solution of the same polymeric material. This strip is 0.5 mm. thick and 0.5 cm. wide. A second sheet of glass is placed on the strips and fastened thereto by the same adhesive. A mixture of the monomeric methyl methacrylate and isobutyl phthalate of the composition given above is now poured into the cell thus formed. The entire cell and contents are then heated to 80° C., keeping the cell preferably in a vertical position with the open edge on top until polymerization is complete.

*Example 2.*—A mixture of 50 parts of ethyl methacrylate, 25 parts of methyl acrylate and 25 parts of isobutyl phthalate is used to make the polymer for the strips and to fill the space between the glass sheets as described in Example 1.

*Example 3.*—Ethyl methacrylate is polymerized in the form of round rods in the presence of a small amount of benzoyl peroxide. The rod is then cut into discs 0.5 mm. thick. These are fastened at appropriate intervals to a glass sheets by means of a solution of polymerized ethyl methacrylate and a second sheet of glass of the same size is in turn fastened in the same way to the discs. A strip of paper is then fastened by means of glue or other adhesive around three edges of the glass, forming a cell. Monomeric ethyl methacrylate containing a small amount of benzoyl peroxide is now poured in until the cell is filled. It is then heated in a preferably vertical position at 70—80° C. until polymerization is complete.

The heating of the glass cell and its contents can be conveniently carried out in the apparatus described in the copending application Ser. No. 748,471 in which the glass cell is placed between the vertical heating units, thus insuring uniform heating of the entire surface of the glass and of the contents. In this way the formation of bubbles in the laminating layer during the polymerization is entirely avoided.

The process is also applicable to other materials which are capable of being hardened by heat as such, for instance, as phenol-formaldehyde resins, urea-formaldehyde, etc. The process may also be applied to the manufacture of glass substitute as described in the copending application Ser. No. 748,471. To this effect two sheets of suitable material for cell walls are used such as metal or glass sheets, the sides of which are closed by a marginal strip of elastic material which gives way as described above. The walls may also be held apart by spacing blocks. The compound to be polymerized so as to serve as glass substitute is poured into the cell where the polymerization takes effect.

As far as the manufacture of glass substitute in metal or glass molds is concerned, only certain of the compounds given above for use as layers for laminated glass are suitable. Only those compounds can be used which alone or with additional substances do not stick to the cell walls under given circumstances, for instance, under the influence of cold air or cold water, so that the products can be removed. Such compounds are, for instance, styrol, esters of methacrylic acid such as methyl ester, ethyl ester, butyl ester, alone or as joint polymerization products containing these compounds. As in the manufacture of laminated glass softening agents may be added, to a considerable extent if suitable, and coloring or darkening matter and catalysts. Substances regulating the polymerization may also be added, for instance aldehydes, oil of turpentine, collophonium. Other substances modifying the properties of the products may be added, for example cellulose compounds such as cellulose ether, cellulose triacetate and cellulose tripropionate. For the manufacture of polymerization products it is to be noted that the polymerization should be started at a temperature near the boiling point for a short time, a period of 2 to 30 minutes has been found convenient, and then completed at a temperature, at least 5° to 30° C. beneath the boiling point. For most compounds a temperature of 65° C.–85° C. has been found advantageous.

*Example 4.*—To ethyl methacrylate is added a small amount of benzoyl peroxide. This mixture is heated 5 minutes to 100° C. and then poured into a cell 5 mm. wide, the main walls consisting of two rectangular plates of metal three sides of which are closed by a strip of polymerized material of the compound named which is 0.5 mm. thick and 5 mm. wide. In this cell the mixture is heated to 70° C. until polymerization is complete. After cooling a slab 5 mm. thick is obtained.

*Example 5.*—To 74.5 parts of methyl ester of methacrylic acid 25 parts of butyl ester of phthalic acid and 0.5 parts of neat's-foot oil and a small amount of benzoyl peroxide are added. This mixture is poured into a cell 10 mm. wide, the main walls consisting of two rectangular sheets of glass three sides of which are closed by paper. The sheets of glass are held apart by means of small spacing blocks at the edges consisting of a mixture of 70 parts of gelatin and 30 parts of glycerin. The fourth side is then also closed with paper. In this cell the mixture is heated for 15 minutes to 90° C. and further for 20 to 30 hours to 75° C. until polymerization is complete. The cell is then placed in cold water. After some time the polymerization product may be easily removed.

Example 6.—50 parts of ethyl methacrylate and 50 parts of methyl methacrylate and a small amount of benzoyl peroxide are poured into a cell and treated as described in Example 5.

Example 7.—80 parts of methyl methacrylate and 18 parts of vinyl acetate and 2 parts of mineral oil and a small amount of benzoyl peroxide are poured into a cell and treated as described in Example 5.

We claim:—

1. The process for the manufacture of laminated glass comprising uniting two sheets of glass by means of a marginal strip of an elastic polymer of an ester of the group consisting of acrylic and methacrylic acids, filling the space between the sheets of glass with an ester of the same group and heating the whole in a preferably vertical position to effect polymerization of said ester.

2. Process for the manufacture of laminated glass comprising uniting two sheets of glass by means of a marginal strip of a joint elastic polymer of at least two esters of the group consisting of acrylic and methacrylic acids, filling the space between the sheets of glass with a mixture of at least two esters of the same group, and heating the whole in a preferably vertical position to effect polymerization of said esters.

3. The process for the manufacture of laminated glass comprising uniting two sheets of glass by means of a marginal strip of a joint elastic polymer of ethyl methacrylate and methyl acrylate, filling the space between the sheets of glass with a mixture of ethyl methacrylate and methyl acrylate and heating the whole in a preferably vertical position to effect polymerization of said esters.

4. The process for the manufacture of laminated glass comprising uniting two sheets of glass by means of a marginal strip of a polymer of methyl methacrylate, filling the space between the sheets of glass with methyl methacrylate and heating the whole in a preferably vertical position to effect polymerization of the methyl methacrylate.

5. The process of manufacturing laminated glass comprising uniting two sheets of glass by means of a strip of paper which overlaps and is glued upon the outside of the glass sheets around the edges but leaving an open space, the two sheets being held apart by spacing blocks consisting of gelatin with softening agents, filling the space between the glass sheets with a polymerizable ester of an acid of the group consisting of acrylic and methacrylic acids and heating the whole to effect the polymerization of said ester.

6. The process of manufacturing laminated glass comprising uniting two sheets of glass by means of spacing blocks of a plastic polymer of an ester of the group consisting of acrylic and methacrylic acids, sealing the edges of the assembly but leaving an open space, filling the space between the glass sheets with an ester of the same group and heating to effect the polymerization of said ester.

7. The process of manufacturing laminated glass comprising uniting two sheets of glass by means of spacing blocks of a plastic joint polymer of at least two esters of the group consisting of acrylic and methacrylic acids, sealing the edges of the assembly but leaving an open space, filling the space between the glass sheets with a mixture of at least two esters of the same group and heating to effect the polymerization of said esters.

8. The process of manufacturing laminated glass comprising uniting two sheets of glass by means of spacing blocks comprising a plastic joint polymer of ethyl methacrylate and methyl acrylate, sealing the edges of the assembly but leaving an open space, filling the space between the glass sheets with a mixture of ethyl methacrylate and methyl acrylate and heating the whole to effect the polymerization of said esters.

9. The process of manufacturing laminated glass comprising uniting two sheets of glass by means of spacing blocks comprising a plastic polymer of methyl methacrylate, sealing the edges of the assembly but leaving an open space, filling the space between the glass sheets with methyl methacrylate, and heating the whole to effect the polymerization of said ester.

10. The process of manufacturing laminated glass which comprises inserting between two sheets of glass relatively thin spacing elements of a polymerized ester of an acid of the group consisting of acrylic and methacrylic acids, filling the space between the glass sheets with the monomeric form of said ester, and subjecting the same to polymerizing influences.

11. The process of manufacturing laminated glass which comprises inserting between two sheets of glass relatively thin spacing elements of a polymerized ester of an acid of the group consisting of acrylic and methacrylic acids, filling the space between the glass sheets with the monomeric form of said ester, and heating the whole to effect polymerization of said monomeric ester.

12. The process of manufacturing laminated glass which comprises inserting between two sheets of glass relatively thin spacing elements of a polymerized mixture of ethyl methacrylate and methyl acrylate, filling the space between the glass sheets with the monomeric form of said mixture, and heating the whole to effect polymerization of said mixture.

OTTO RÖHM.
WALTER BAUER.